United States Patent
Choi

(10) Patent No.: US 11,294,780 B2
(45) Date of Patent: Apr. 5, 2022

(54) MEMORY CONTROLLER AND OPERATING METHOD THEREOF

(71) Applicant: SK hynix Inc., Gyeonggi-do (KR)

(72) Inventor: Moon Soo Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 194 days.

(21) Appl. No.: 16/706,261

(22) Filed: Dec. 6, 2019

(65) Prior Publication Data
US 2021/0034478 A1 Feb. 4, 2021

(30) Foreign Application Priority Data
Jul. 30, 2019 (KR) .................. 10-2019-0092325

(51) Int. Cl.
| | | |
|---|---|---|
| G06F 11/00 | (2006.01) | |
| G06F 11/16 | (2006.01) | |
| G06F 11/10 | (2006.01) | |
| G06F 9/4401 | (2018.01) | |
| G06F 11/30 | (2006.01) | |
| G06F 13/16 | (2006.01) | |
| G06F 11/36 | (2006.01) | |

(52) U.S. Cl.
CPC ........ *G06F 11/1658* (2013.01); *G06F 9/4418* (2013.01); *G06F 11/1016* (2013.01); *G06F 11/3037* (2013.01); *G06F 11/3648* (2013.01); *G06F 13/1668* (2013.01)

(58) Field of Classification Search
CPC ............... G06F 11/1016; G06F 9/4418; G06F 13/1668; G06F 11/3648; G06F 11/3656; G06F 11/1658; G06F 11/3037
See application file for complete search history.

(56) References Cited

U.S. PATENT DOCUMENTS

| | | | | |
|---|---|---|---|---|
| 5,892,294 A | * | 4/1999 | Reid | A63F 9/143 |
| | | | | 307/10.1 |
| 6,482,902 B1 | * | 11/2002 | Bohnen | C08F 10/00 |
| | | | | 526/127 |
| 6,553,513 B1 | * | 4/2003 | Swoboda | G06F 11/3656 |
| | | | | 714/25 |
| 6,564,339 B1 | * | 5/2003 | Swoboda | G06F 11/3656 |
| | | | | 714/25 |

(Continued)

FOREIGN PATENT DOCUMENTS

| | | |
|---|---|---|
| KR | 10-2005-0101839 | 10/2005 |
| KR | 10-2017-0110072 | 10/2017 |

*Primary Examiner* — Amine Riad
(74) *Attorney, Agent, or Firm* — IP & T Group LLP

(57) ABSTRACT

A memory controller capable of detecting a code having an error among codes stored in a Read Only Memory (ROM) controls a memory device. The memory controller includes: a code memory for storing codes used to perform an operation; a code executor for executing the codes stored in the code memory to perform the operation; a debug controller for setting a suspend code address for suspending the execution of the codes used to perform the operation; an initialization controller for controlling an initialization operation of at least one of the debug controller and the code executor; and an interfacing component for receiving a suspend code setting request corresponding to an operation of setting the suspend code address and providing the received suspend code setting request to the debug controller.

19 Claims, 16 Drawing Sheets

(56) References Cited

U.S. PATENT DOCUMENTS

| | | | | |
|---|---|---|---|---|
| 6,836,757 | B1* | 12/2004 | Swoboda | G06F 11/261 |
| | | | | 370/510 |
| 7,444,553 | B2* | 10/2008 | Kimura | G06F 11/3636 |
| | | | | 714/45 |
| 7,823,131 | B2* | 10/2010 | Gard | G06F 11/3656 |
| | | | | 717/125 |
| 8,069,373 | B2* | 11/2011 | Vorbach | G06F 11/26 |
| | | | | 714/38.1 |
| 9,720,704 | B2* | 8/2017 | Reick | G06F 8/654 |
| 2002/0138801 | A1* | 9/2002 | Wang | G01R 31/31705 |
| | | | | 714/729 |
| 2004/0123192 | A1* | 6/2004 | Caty | G11C 29/16 |
| | | | | 714/718 |
| 2004/0123200 | A1* | 6/2004 | Caty | G01R 31/31724 |
| | | | | 714/733 |
| 2006/0048011 | A1* | 3/2006 | Dieffenderfer | G06F 11/3466 |
| | | | | 714/38.1 |
| 2009/0204384 | A1* | 8/2009 | Akiba | G06F 11/3652 |
| | | | | 703/28 |
| 2012/0151452 | A1* | 6/2012 | Zinkovsky | H04L 65/1066 |
| | | | | 717/129 |
| 2014/0281722 | A1* | 9/2014 | Kraipak | G06F 11/3648 |
| | | | | 714/34 |
| 2017/0046288 | A1* | 2/2017 | Hopkins | G06F 13/4068 |
| 2018/0173644 | A1* | 6/2018 | Koeberl | G06F 21/74 |
| 2018/0253368 | A1* | 9/2018 | Villarreal | G06F 11/3664 |
| 2019/0354452 | A1* | 11/2019 | Mehra | G06F 11/1076 |

* cited by examiner

FIG. 4

| CLASSIFICATION | INITIALIZATION BIT (IBIT) |
|---|---|
| DEBUG CONTROLLER | 1 |
| CODE EXECUTOR | 0 |
| UART | 0 |
| ... | ... |
| TIMER | 0 |

FIG. 6

| CODE ADDRESS (CODE_ADDR) | CODE |
|---|---|
| 0x0 | CODE1 |
| 0x4 | CODE2 |
| 0x8 | CODE3 |
| 0x12 | CODE4 |
| 0x16 | CODE5 |
| 0x20 | CODE6 |

FIG. 8

| CLASSIFICATION | INITIALIZATION BIT (IBIT) |
|---|---|
| DEBUG CONTROLLER | 1 |
| CODE EXECUTOR | 1 |
| UART | 0 |
| ... | ... |
| TIMER | 0 |

MEMORY CONTROLLER AND OPERATING METHOD THEREOF

CROSS-REFERENCE TO RELATED APPLICATION

The present application claims priority under 35 U.S.C. § 119(a) to Korean patent application number 10-2019-0092325, filed on Jul. 30, 2019, which is incorporated herein by reference in its entirety.

BACKGROUND

Field of Invention

The present disclosure generally relates to an electronic device, and more particularly, to a memory controller and an operating method thereof.

Description of Related Art

A storage device stores data under the control of a host device such as a computer, a smart phone or a smart pad. Such storage device may be of a type that stores data on a magnetic disk, such as a Hard Disk Drive (HDD), or of a type that stores data on a semiconductor memory, i.e., a nonvolatile memory, such as a Solid State Drive (SSD) or a memory card.

A storage device may include a memory device configured to store data and a memory controller configured to control the memory device. Such memory device may be a volatile memory device or a nonvolatile memory device. Examples of a nonvolatile memory device include a Read Only Memory (ROM), a Programmable ROM (PROM), an Electrically Programmable ROM (EPROM), an Electrically Erasable and Programmable ROM (EEPROM), a flash memory, a Phase-change RAM (PRAM), a Magnetic RAM (MRAM), a Resistive RAM (RRAM), and a Ferroelectric RAM (FRAM).

SUMMARY

Embodiments provide a memory controller capable of detecting a code having an error among codes stored in a Read Only Memory (ROM), and an operating method of the memory controller.

In accordance with an aspect of the present disclosure, there is provided a memory controller including: a code memory configured to store codes used to perform an operation, a code executor configured to execute the codes stored in the code memory to perform the operation, a debug controller configured to set a suspend code address for suspending the execution of the codes used to perform the operation, an initialization controller configured to control an initialization operation of at least one of the debug controller and the code executor and an interfacing component configured to receive a suspend code setting request corresponding to an operation of setting the suspend code address and provide the received suspend code setting request to the debug controller.

In accordance with another aspect of the present disclosure, there is provided a method for operating a memory controller for controlling a memory device, the method including: performing an initialization operation of a debug controller for setting a suspend code address for a suspend code among codes used to perform an operation, the codes being stored in a code memory, setting the suspend code address and performing an initialization operation of a code executor for executing the codes stored in the code memory.

In accordance with another aspect of the present disclosure, there is provided an operating method of a controller, the method comprising, initializing an initializer in a debug mode upon power-on of the controller, initializing, by the initializer, a selector, selecting, by the selector, one of plural sequential codes, initializing, by the initializer, an executor after the selecting and executing, by the executor, one or more codes before the selected code of the sequential codes, wherein the executing causes the controller to control the memory device to perform an operation, and wherein the controlling causes debugging the one or more codes.

BRIEF DESCRIPTION OF THE DRAWINGS

Various embodiments are described more fully below with reference to the accompanying drawings; however, the present invention may be embodied in different forms and thus should not be construed as limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a diagram illustrating a method for setting initialization bits for controlling the initialization operation of a debug controller, such as that shown in FIG. 3.

FIG. 6 is a diagram illustrating codes stored in a Read Only Memory (ROM), such as that shown in FIG. 2, and a code address of each of the codes.

FIG. 8 is a diagram illustrating a method for setting initialization bits for controlling the initialization operation of a code executor, such as that shown in FIG. 3.

DETAILED DESCRIPTION

The specific structural and functional description herein is directed to embodiments of the present invention. The present invention, however, can be implemented in various other forms, and thus is not limited to the embodiments set forth herein.

Various embodiments of the present disclosure are described in detail below with reference to the accompanying drawings in order for those skilled in the art to be able to readily implement and practice the present invention. Throughout the specification, reference to "an embodiment," "another embodiment" or the like is not necessarily to only one embodiment, and different references to any such phrase are not necessarily to the same embodiment(s). Also, the phrase "at least one of" used in conjunction with a list of elements or operations, e.g., A and B, means only A, only B, or both A and B.

Figure 1:
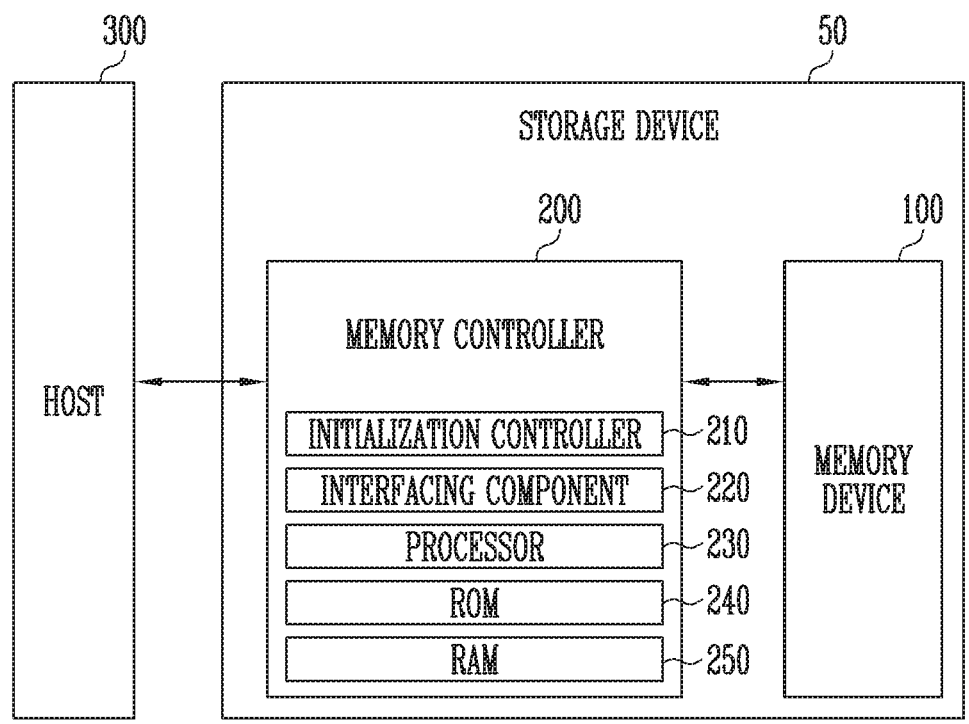
FIG. 1 is a block diagram illustrating a storage device.

FIG. 1 is a block diagram illustrating a storage device.

Referring to FIG. 1, the storage device 50 may include a memory device 100 and a memory controller 200.

The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented with a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), and/or a memory stick.

The storage device 50 may be manufactured as any of various kinds of package types. For example, the storage device 50 may be manufactured as a Package-On-Package (POP), a System-In-Package (SIP), a System-On-Chip (SOC), a Multi-Chip Package (MCP), a Chip-On-Board (COB), a Wafer-level Fabricated Package (WFP), and/or a Wafer-level Stack Package (WSP).

The memory controller 200 may control overall operations of the storage device 50.

When power is applied to the storage device 50, the memory controller 200 may execute firmware (FW). When the memory device 100 is a flash memory device, the memory controller 200 may execute FW such as a flash translation layer (FTL) for controlling communication between the host 300 and the memory device 100.

The memory controller 200 may include an initialization controller 210. The initialization controller 210 may be an initializer. Before power is applied to the memory controller 200, the operation mode of the memory controller 200 may be set as a debug mode by a signal applied to an external pin. Subsequently, when the power is applied to the memory controller 200, a connection bit for allowing an external device to be connected to the initialization controller 210 through an interfacing component 220 may be set. When the connection bit for allowing the external device to be connected to the initialization controller 210 through the interfacing component 220 is set, the external device may set the initialization controller 210 to start an initialization operation.

After the initialization controller 210 starts the initialization operation, the initialization controller 210 may control initialization of other components included in the memory controller 200. That is, the initialization controller 210 may perform the initialization operation first. When the initialization controller 210 starts the initialization operation, each of other components such as a processor 230, a Universal Asynchronous Receiver/Transmitter (UART), and a TIMER, which are included in the memory controller 200, may postpone an initialization operation.

After the initialization controller 210 completes the initialization operation, the initialization controller 210 may control initialization of at least one of the components included in the memory controller 200. The initialization controller 210 may simultaneously or sequentially initialize the other components in the memory controller 200 after the initialization operation of the initialization controller 210 is completed.

The memory controller 200 may include the interfacing component 220. The interfacing component 220 may connect the memory controller 200 and the external device to each other. Also, the interfacing component 220 may connect components of the memory controller 200 to each other. When the external device is connected to the interfacing component 220, the interfacing component 220 may instruct setting of initialization bits for initializing components of the memory controller 200.

Specifically, the interfacing component 220 may provide the initialization controller 210 with an initialization bit setting request IBITSET_REQ for setting an initialization bit of the initialization controller 210. The initialization controller 210 may set initialization bits, based on the initialization bit setting request IBITSET_REQ. The initialization controller 210 may control an initialization operation of each of components of the memory controller 200 to be started, based on the initialization bits. That is, the initialization bits may be individually set with respect to the processor 230 that is a component of the memory controller 200 and other components. Further, in the present disclosure, the initialization controller 210 may individually set initialization bits corresponding to a debug controller and a code executor, which are included in the processor 230.

The memory controller 200 may include the processor 230. When the power of the memory controller 200 is on, the processor 230 may execute codes store in a Read Only Memory (ROM) 240. The ROM 240 may be a code memory in which codes used to perform an operation are stored.

Specifically, the processor 230 may include the debug controller and the code executor. The processor 230 may drive firmware, and the debug controller and the code executor may be implemented as firmware driven by the processor 230.

The debug controller may set a suspend code address for suspending the execution of a code among the codes stored in the ROM 240. Accordingly, a code corresponding to the suspend code address among the codes stored in the ROM 240 is set as a suspend code. Consequently, the debug controller may set any one of the codes stored in the ROM 240 as the suspend code, by setting the suspend code address.

The code executor may execute the codes stored in the ROM 240. Specifically, the code executor may sequentially execute the codes stored in the ROM 240 from a start code among the codes stored in the ROM 240. When the suspend code is not set in the debug controller, the code executor may execute the codes stored in the ROM 240 up to the last code stored in the ROM 240. However, when the suspend code is set in the debug controller, the code executor may suspend the execution of a code, when the code executor receives the suspend code.

The memory controller 200 may include the ROM 240. After the power of the memory controller 200 is on, the ROM 240 may include codes to be executed such that the memory device 100 performs an operation. That is, codes for performing a background operation may be stored in the ROM 240. When some or all of the codes stored in the ROM 240 are executed, the memory device 100 may perform an operation.

In the present disclosure, a case where codes for performing an operation are stored in the ROM 240 is described. However, the codes for performing the operation may be stored in various other memories instead of or in addition to the ROM 240.

The codes stored in the ROM 240 may be in a state in which the codes are transmitted to the code executor to be executed when the power is applied to the memory controller 200. However, the codes stored in the ROM 240 may not be provided to the processor 230 until before the processor 230 is completely ready to execute a code.

Since the codes stored in the ROM 240 are to be executed when the power of the memory controller 200 is on, the codes remain stored in the ROM 240 even when the power of the memory controller 200 is off. That is, the ROM 240 may be configured as a nonvolatile memory.

The memory controller 200 may include a Random Access Memory (RAM) 250. The RAM 250 may receive and store codes stored in the memory device 100. Since the RAM 250 is configured as a volatile memory, the codes stored in the RAM 250 may disappear, when the power of the memory controller 200 is off. Therefore, after the power of the memory controller 200 is on, the codes stored in the memory device 100 may be stored in the RAM 250 such that the memory controller 200 executes the codes.

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, a case where the memory device 100 is a NAND flash memory is assumed and described.

In an embodiment, the memory device 100 may be implemented in a three-dimensional array structure. The present disclosure may be applied to not only a flash memory device in which a charge storage layer is configured with a Floating Gate (FG) but also a Charge Trap Flash (CTF) in which a charge storage layer is configured with an insulating layer.

In an embodiment, each of the memory cells included in the memory device 100 may be configured as a Single Level Cell (SLC) storing one data bit. Alternatively, each of the memory cells included in the memory device 100 may be configured as a Multi-Level Cell (MLC) storing two data bits, a Triple Level Cell (TLC) storing three data bits, or a Quad Level Cell (QLC) storing four data bits.

The memory device 100 is configured to receive a command and an address from the memory controller 200 and access an area selected by the address in the memory cell array. That is, the memory device 100 may perform an operation corresponding to the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

The memory device 100 may perform a program operation or erase operation by using a set operating voltage under the control of the memory controller 200.

In an embodiment, the memory controller 200 may receive data and a Logical Block Address (LBA) from the host 300, and translate the LBA into a Physical Block Address (PBA) representing addresses of memory cells in the memory device 100 in which data is to be stored. Also, the memory controller 200 may store, in a buffer memory, mapping information that establishes a mapping relationship between the LBA and the PBA.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a program command, an address, and data without any request from the host 300, and transmit the program command, the address, and the data to the memory device 100. For example, the memory controller 200 may provide the command, the address, and the data to the memory device 100 to perform a background operation, such as a wear leveling or garbage collection.

In an embodiment, the memory controller 200 may control at least two memory devices 100. The memory controller 200 may control the memory devices according to an interleaving scheme so as to improve operational performance.

The host 300 may communicate with the storage device 50, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
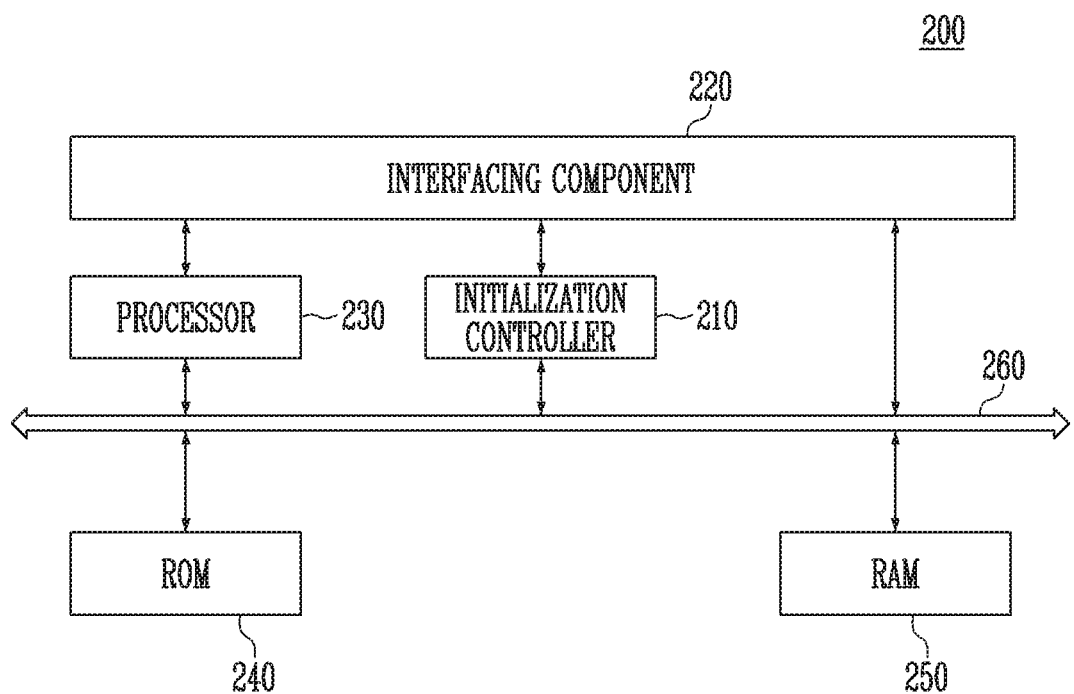
FIG. 2 is a block diagram illustrating an embodiment of a memory controller, such as that shown in FIG. 1.

FIG. 2 is a block diagram illustrating an embodiment of the memory controller shown in FIG. 1.

Referring to FIG. 2, the memory controller 200 shown in FIG. 2 may include an initialization controller 210, an interfacing component 220, a processor 230, a Read Only Memory (ROM) 240, and a Random Access Memory (RAM) 250. Each of the components of the memory controller 200 except the interfacing component 220 may be connected to another component through a bus 260 and the interfacing component 220. In addition, each of the components of the memory controller 200 except the interfacing component 220 may be connected to an external device through the bus 260 and the interfacing component 220.

In an embodiment, the initialization controller 210 may control an initialization operation. The initialization controller 210 may control an initialization operation of at least one of a debug controller and a code executor, which are included in the processor 230. The initialization operation of any one of the components of the memory controller 200 may include changing the state of the component from a state in which the component cannot any operation (non-operational state) to a state in which the component can perform an operation (operational state), when power of the memory controller 200 is on after the power of the memory controller 200 is off.

Specifically, when the power of the memory controller 200 is on after the power of the memory controller 200 is off, the initialization controller 210 may perform an initialization operation first of all. That is, when the power of the memory controller 200 is on after the power of the memory controller 200 is off, the state of the initialization controller 210 may become a state in which the initialization controller can perform an operation first of all. That is, the initialization controller 210 among the components of the memory controller 200 may perform an operation first of all.

After the initialization controller 210 performs the initialization operation, the initialization controller 210 may control an initialization operation of at least one of the debug controller and the code executor, which are included in the processor 230. That is, the initialization controller 210 may control the debug controller and/or the code executor, which are included in the processor 230, to perform an operation. The initialization controller 210 may perform such control through the bus 260.

In an embodiment, the interfacing component 220 may connect the external device and the memory controller 200 to each other. Also, the interfacing component 220 may connect components of the memory controller 200 to each other. The term "connect" and variations thereof, cover a non-physical (wireless) connection in addition to a physical (wired) connection.

Specifically, the interfacing component 220 may be connected to the external device. Therefore, when the external device is connected to the interfacing component, a request and data, which are received from the external device, may be provided to components of the memory controller 200 through the interfacing component 200.

In an embodiment, the interfacing component 220 may receive a request and data from the external device, and provide the received request and the received data to the processor 230 or the initialization controller 210. However, in an embodiment of the present disclosure, in order to detect an erroneous code, the interfacing component 220 may provide a request and data, which are received from the external device, to the processor 230, the initialization controller 210, or the RAM 250 through the bus 260.

Consequently, the interfacing component 220 may connect components of the memory controller 200 to each other. That is, components of the memory controller 200 may be connected to each other through the bus 260, or be connected to each other through the interfacing component 220.

In an embodiment, the processor 230 may execute codes stored in the ROM 240. Specifically, the processor 230 may execute the codes stored in the ROM 240 from a start code from the last code among the codes stored in the ROM 240. The processor 230 may sequentially or execute the codes stored in the ROM 240.

In the present disclosure, a case where codes used to perform an operation are stored in the ROM 240. However, the codes for performing the operation may be stored in various other memories instead of or in addition to the ROM 240.

After the initialization controller 210 performs the initialization operation, the initialization controller 210 may control an initialization operation of the processor 230. That is, after the initialization controller 210 performs the initialization operation, the initialization controller 210 may change the state of the processor 230 to a state in which the processor can perform an operation. When the processor 230 performs the initialization operation, the processor 230 may set a suspend code address corresponding to a suspend code among the codes stored in the ROM 240. That is, a code corresponding to the suspend code address may be set as a suspend code. The suspend code may cause the processor 230 to suspend code execution.

When an address of a code received from the ROM 240 and the suspend code address are the same after the processor 230 sets the suspend code address, the processor 230 may suspend the execution of a code. That is, the processor 230 may not execute a suspend code corresponding to the suspend code address. When the processor 230 does not set the suspend code address, the processor 230 does not suspend the execution of a code but may sequentially execute the codes up to the last code.

In an embodiment, the ROM 240 may store codes for allowing the memory device 100 to perform an operation. When the power of the memory controller 200 is on, the codes stored in the ROM 240 may be executed. When the codes stored in the ROM 240 are executed, the memory controller 200 and the memory device 100 may perform an operation. That is, in a background operation, the codes stored in the ROM 240 may be executed.

Specifically, the codes stored in the ROM 240 may be in a state in which the codes are transmitted to the code executor to be executed, when the power is applied to the memory controller 200. However, the codes stored in the ROM 240 may not be provided to the processor 230 until just before both the debug controller and the code executor, which are included in the processor 230, perform an initialization operation. That is, the codes stored in the ROM 240 may not be provided to the processor 230 until before the processor 230 is completely ready to execute a code.

In another embodiment, the codes stored in the ROM 240 may be executed, even after the memory controller 200 and the memory controller 200 perform an operation.

Since the codes stored in the ROM 240 are to be executed whenever the power of the memory controller 200 is on, the codes stored in the ROM 240 do not disappear even when the power of the memory controller 200 is off. Therefore, the ROM 240 may be configured as a nonvolatile memory. After codes are stored in the ROM 240, the codes stored in the ROM 240 may be changed. Therefore, the codes stored in the ROM 240 are only readable.

In an embodiment, when a suspend code is set, the codes stored in the ROM 240 may be performed up to before the suspend code.

In an embodiment, the RAM 250 may store codes. The RAM 250 may be configured as a volatile memory. That is, when the power of the memory controller 200 is off, the codes stored in the RAM 250 may disappear.

Specifically, the RAM 250 is readable and writable. Therefore, the RAM 250 may receive and store codes stored in the memory device 100. That is, the memory controller 200 may receive codes stored in the memory device 100, store the stored data in the RAM 250, and execute the codes stored in the RAM 250.

In an embodiment, the RAM 250 may receive codes that are not stored in the ROM 240. That is, the RAM 250 may receive, from the memory device 100, codes that are not stored in the ROM 240 among codes that the processor 230 is to perform.

The RAM 250 may postpone an initialization operation until before the processor 230 performs the initialization operation. That is, the RAM 250 may not receive data from the memory device 100 until before the processor 230 is completely ready to execute a code. When the processor 230 is completely ready to execute a code, the RAM 250 may receive data from the memory device 100.

Figure 3:
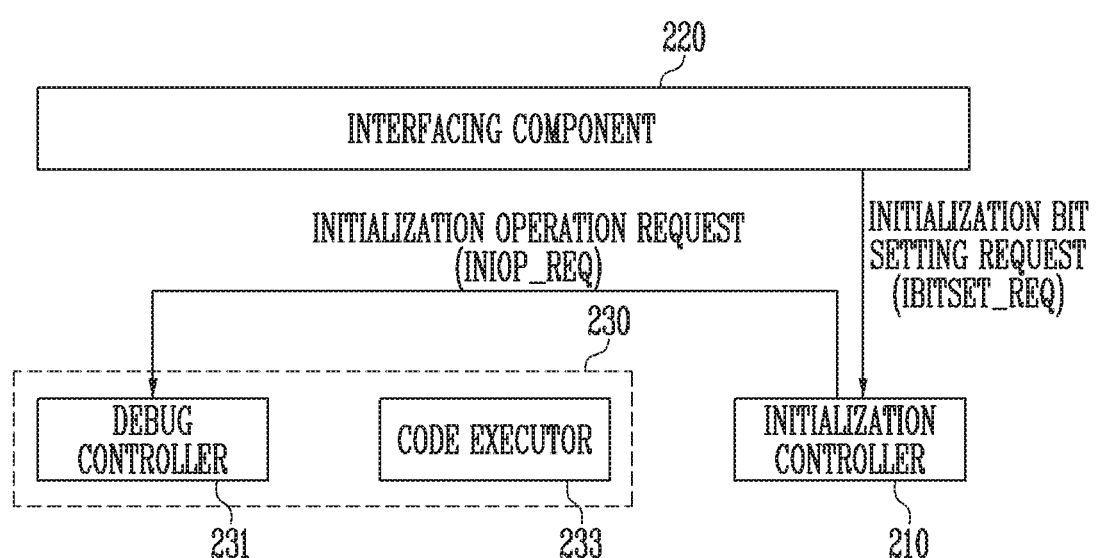
FIG. 3 is a diagram illustrating an initialization operation of a debug controller included in a processor, such as that shown in FIG. 2.

FIG. 3 is a diagram illustrating an initialization operation of the debug controller included in the processor shown in FIG. 2.

Referring to FIG. 3, the memory controller 200 shown in FIG. 3 may include the initialization controller 210, the interfacing component 220, and the processor 230. The processor 230 may include a debug controller 231 and a code executor 233. The debug controller 231 and the code executor 233 may be a selector and an executor, respectively. In FIG. 3, the ROM 240 and the RAM 250 are not shown for clarity. However, such components may be part of the memory controller 200 as shown in FIG. 2.

In an embodiment, when the processor 230 executes an erroneous code among the codes stored in the ROM 240, operations of the memory controller 200 and the memory device 100 may be suspended. When the operation of the memory controller 200 is suspended, the bus 260 through which the components of the memory controller 200 are connected to each other may be interrupted.

Therefore, an operation for detecting an erroneous code may be performed. In order to detect the erroneous code, an external device may be connected to the interfacing component 220. The external device may include a debugger.

When the operations of the memory controller 200 and the memory device 100 are suspended since the erroneous code is executed, the operation mode of the memory controller 200 may be set to a debug mode after the power of the memory controller 200 is off. The debug mode may be set by an external pin of the storage device 50 including the memory controller 200 and the memory device 100. That is, the operation mode of the memory controller 200 may be set as the debug mode according to a combination of a high signal and a low signal, which are applied to the external pin connected to the storage device 50.

The power of the memory controller 200 may be on after the operation mode of the memory controller 200 is set as the debug mode. When the power of the memory controller 200 is on, and the external device is connected to the interfacing component 220, an operation for detecting an erroneous code may be performed.

However, when the operations of the memory controller 200 and the memory device 100 are suspended before the external device is connected to the interfacing component 220, the external device cannot be connected to the interfacing component 220. When the external device is not connected to the interfacing component 220, an erroneous code cannot be detected. Therefore, when the external device cannot be connected to the interfacing component 220, an operation for allowing the external device to be connected to the interfacing component 220 may be performed.

FIGS. 3 to 7 illustrate an operation for connecting the external device to the interfacing component 220.

In FIG. 3, the operation mode of the memory controller 200 may be set as the debug mode. The debug mode may be an operation mode of the memory controller 200 in which an erroneous code is detected by connecting the external device to the interfacing component 220. When the operation mode of the memory controller 200 is set as the debug mode, the memory controller 200 may perform an operation for detecting an erroneous code stored in the ROM 240.

In an embodiment, before the power is applied to the memory controller 200, the operation mode of the memory controller 200 may be set as the debug mode. The debug mode may be set by the external pin connected to the storage device 50 including the memory controller 200 and the memory device 100.

The debug mode may be set before the power is applied to the memory controller 200. When the operation mode of the memory controller 200 is set as the debug mode, the components of the memory controller 200 may postpone an initialization operation even when the power is applied to the memory controller 200. Initialization bits included in the initialization controller 210 may be set such that each of the components of the memory controller 200 postpone an initialization operation. That is, after the power is applied to the memory controller 200, each of the components of the memory controller 200 may not perform the initialization operation.

In an embodiment, when the operation mode of the memory controller 200 is set as the debug mode, the power may be applied to the memory controller 200. When the power is applied to the memory controller 200, an operation for detecting an erroneous code may be performed.

When the power is applied to the memory controller 200, the external device may select any one of connection bits included in the interfacing component 220. A connection bit of the interfacing component 220 may correspond to a component of the memory controller 200, which is connected to the interfacing component 220. That is, the connection bits may be set, e.g., in advance, such that each bit corresponds to a different one of the components in the memory controller 200, and the external device may select the connection bit corresponding to a component that is to be connected to the interfacing component 220 among the connection bits.

In an embodiment, when the external device sets the connection bit of an associated component to "0," the interfacing component 220 may be connected to the initialization controller 210. When the external device sets that connection bit to "1," the interfacing component 220 may be connected to the processor 230.

In another embodiment, various components may be connected to the interfacing component 220 according to a connection bit set by the external device.

When the operation mode of the memory controller 200 is set as the debug mode by the external pin, the power may be applied to the memory controller 200. When the interfacing component 220 and the initialization controller 210 are connected to each other since the external device sets the connection bit to "0" after the power may be applied to the memory controller 200, the initialization controller 210 may perform an initialization operation. The initialization operation for a given component may change the state of that component from non-operational to operational, when the power of the memory controller 200 is on after the power of the memory controller is off. After the initialization controller 210 performs the initialization operation, the initialization controller may perform an operation for detecting an erroneous code.

In an embodiment, the initialization controller 210 may include initialization bits IBIT. The initialization bits IBIT may include a bit corresponding to each of the components of the memory controller 200. The bits of IBIT may be for initializing the components of the memory controller 200, respectively. Before the power is applied to the memory controller 200, all of the bits of IBIT may be set to a default value. The default value may be "0" or "1." In the present disclosure, a case where the default value of the initialization bits IBIT is "0" is assumed.

The initialization bits IBIT are described in more detail with reference to FIGS. 4 and 8.

When the initialization controller 210 starts the initialization operation, the initialization bits IBIT may be set such that the debug controller 231 and the code executor 233 postpone an initialization operation.

After the initialization controller 210 performs the initialization operation, the initialization controller 210 may receive an initialization bit setting request IBITSET_REQ from the interfacing component 220. The initialization bit setting request IBITSET_REQ may be a request for initializing the debug controller 231.

Consequently, after the power of the memory controller 200 is on, the initialization controller 210 may perform the initialization operation first. When the initialization controller 210 performs the initialization operation, the initialization controller 210 may receive the initialization bit setting request IBITSET_REQ from the interfacing component 220.

In an embodiment, the initialization controller 210 may set the initialization bits IBIT, based on the initialization bit setting request IBITSET_REQ. Therefore, the interfacing component 220 may provide the initialization bit setting request IBITSET_REQ to the initialization controller 210, to sequentially and separately initialize the components of the memory controller 200.

The initialization controller 210 may set the initialization bits IBIT, based on the received initialization bit setting request IBITSET_REQ. An initialization bit setting request IBITSET_REQ initially received after the power of the memory controller 200 is on may be a request for changing a bit corresponding to the debug controller 231.

Therefore, the initialization controller 210 may set a bit corresponding to the debug controller 231 of the initialization bits IBIT, based on the initialization bit setting request IBITSET_REQ initially received after the power of the memory controller 200 is on. The initialization controller 210 may set initialization bits IBIT for starting an initialization operation of the debug controller 231.

The initialization controller 210 may set initialization bits IBIT such that the code executor 233 postpones an initialization operation. Specifically, the initialization bits IBIT may be set such that the code executor 233 postpones the initialization operation until before a suspend code address is set after the debug controller 231 starts the initialization operation.

Consequently, the initialization controller 210 may control the debug controller 231 to change initialization bits IBIT to start an initialization operation, and to perform the initialization operation, based on the changed initialization bits IBIT.

When a bit corresponding to the debug controller 231, among the bits in the initialization bits IBIT, is set, the initialization controller 210 may output an initialization operation request INIOP_REQ to the debug controller 231. The debug controller 231 may perform an initialization operation, based on the initialization operation request INIOP_REQ. That is, the state of the debug controller 231 may be changed to the operational state, i.e., a state in which the debug controller 231 can perform an operation, when the debug controller 231 receives the initialization operation request INIOP_REQ. The operation performed by the debug controller 231 may include setting a suspend code among the codes stored in the ROM 240.

In an embodiment, while the debug controller 231 is performing the initialization operation, the code executor 233 may not perform any initialization operation. That is, while the debug controller 231 is performing the initialization operation, an initialization of the code executor 233 may be postponed. When the initialization of the code executor 233 is postponed, an operation of the processor 230 may not be suspended.

In an embodiment, while the code executor 233 is postponing the initialization operation, the external device may be connected to the debug controller 231 through the interfacing component 220 and the initialization controller 210. A process of providing a suspend code setting request to the debug controller 231 through the interfacing component 220 and the initialization controller 210 is described in more detail with reference to FIG. 5.

FIG. 4 is a diagram illustrating a method for setting initialization bits for controlling the initialization operation of the debug controller shown in FIG. 3.

Referring to FIG. 4, a first column shown in FIG. 4 represents components of the memory controller 200, and a second column shown in FIG. 4 represents initialization bits IBIT, each matched with its corresponding component. The initialization bits IBIT shown in FIG. 4 may be stored in the initialization controller 210. The initialization bits IBIT shown in FIG. 4 may respectively correspond to the components of the memory controller 200. When a bit in the initialization bits IBIT is changed, the initialization controller 210 may control an initialization operation of the corresponding component in response to that change.

FIG. 4 identifies the debug controller 231, the code executor 233, a Universal Asynchronous Receiver/Transmitter (UART), and a TIMER as components of the memory controller 200. However, additional or other components may be included in FIG. 4. Regardless of how many components are included in the memory controller 200, an initialization bit corresponding to each component may be stored in the initialization controller 210. One or more components for detecting an erroneous code may be included in the memory controller 200 and hence the list in FIG. 4.

In FIG. 4, the default value of each bit of IBIT is "0". That is, before an initialization bit setting request IBITSET_REQ is received from the interfacing component 220, the bits of the initialization bits IBIT may all be "0." When the initialization controller 210 receives the initialization bit setting request IBITSET_REQ, the bits of the initialization bits IBIT may be sequentially changed to "1" starting from a bit corresponding to the debug controller 231.

When the bits of IBIT are all "0," the initialization controller 210 may not perform any operation for initializing any component. When a bit of IBIT is changed from "0" to "1," the initialization controller 210 may perform an operation for initializing the corresponding component.

FIG. 4 illustrates that initialization bits IBIT are set when the initialization controller 210 initially receives an initialization bit setting request IBITSET_REQ from the interfacing component 220, after the power of the memory controller is on.

In an embodiment, the initialization controller 210 may change a bit corresponding to the debug controller 231, based on the initialization bit setting request IBITSET_REQ. Specifically, the initialization controller 210 may change the bit corresponding to the debug controller 231 from "0" to "1." When the bit corresponding to the debug controller 231 is changed, the initialization controller 210 may output an initialization operation request INIOP_REQ to the debug controller 231. The debug controller 231 may be in a state in which the debug controller 231 can perform an operation, based on the initialization operation request INIOP_REQ.

While the debug controller 231 is performing an initialization operation, other components may not perform any initialization operation. That is, since bits corresponding to components such as the code executor 233, the UART, and the TIMER are "0," the corresponding components may not perform any initialization operation.

Specifically, the initialization controller 210 may set the initialization bits IBIT such that the code executor 233 postpones the initialization operation of each of the other components while the debug controller 231 is performing the initialization operation. The initialization bits IBIT may be set such that the code executor 233 postpones initialization until before a suspend code address is set after the debug controller 231 starts the initialization operation.

When bits of IBIT are not changed, an initialization operation of each of components corresponding to the unchanged bits may be postponed. Therefore, each of the components in the memory controller 200 may be initialized respectively at different times. In particular, each of the debug controller 231 and the code executor 233, which are included in the processor 230, may be separately initialized. That is, after the debug controller 231 performs an initialization operation, the code executor 233 may perform an initialization operation.

Conventionally, when the power of the memory controller was on after the power of the memory controller was off, the debug controller 231 and the code executor 233, which are included in the processor 230, were simultaneously initialized. However, since the debug controller 231 and the code executor 233 were simultaneously initialized, operations of the memory controller 200 and the memory device 100 were suspended when the code executor 233 performed an erroneous code, and therefore, the erroneous code could not be detected.

Accordingly, in order to set a suspend code address for allowing the code executor 233 to suspend the execution of a code, each of the debug controller 231 and the code executor 233 may separately perform an initialization operation. That is, in embodiments of the present disclosure, a method is provided for detecting an erroneous code when each of the debug controller 231 and the code executor 233 separately performs an initialization operation.

In an embodiment, in order to detect an erroneous code, initialization bits of some other components in the memory controller 200 in addition to the components shown in FIG. 4 may be changed to "1." That is, each of components for detecting an erroneous code may perform an initialization operation. Therefore, initialization bits of components, each of which an initialization operation is not required to detect an erroneous code, may not be changed to "1."

Figure 5:
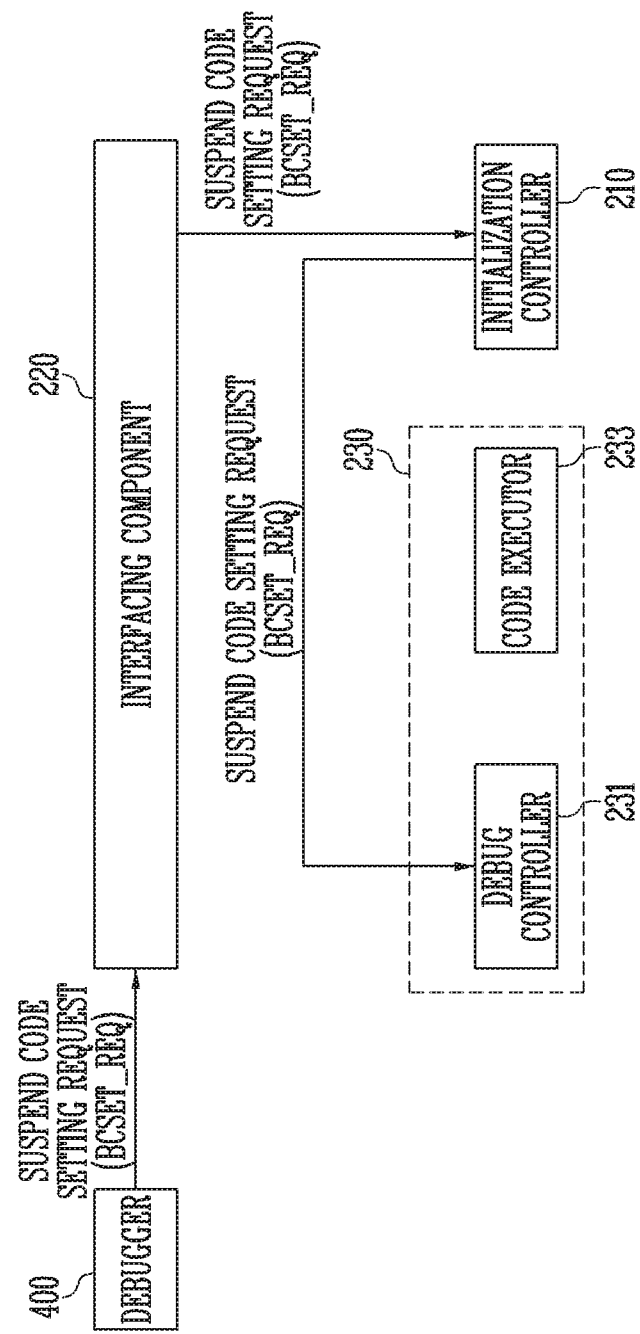
FIG. 5 is a diagram illustrating a method in which a debug controller, such as that shown in FIG. 3, sets a suspend code.

FIG. 5 is a diagram illustrating a method in which the debug controller shown in FIG. 3 sets a suspend code.

FIG. 5 illustrates an external device connected to the interfacing component 220, and the initialization controller 210, the interfacing component 220, and the processor 230 among the components of the memory controller 200. The external device may include a debugger 400. The debugger 400 may perform an operation of detecting an erroneous code among codes stored in the ROM 240. The processor 230 may include the debug controller 231 and the code executor 233.

In FIG. 5, the ROM 240, and the RAM 250 are omitted for clarity, although the memory controller 200 may still include such components.

FIG. 5 illustrates an operation after the power of the memory controller 200 is on after the operation mode of the memory controller 200 is set as a debug mode, and the debug controller 231 performs an initialization operation.

In FIG. 5, the external device may set a connection bit to "0." When the external device sets the connection bit to "0," the interfacing component 220 may be connected to the initialization controller 210. When the interfacing component 220 is connected to the initialization controller 210, the initialization controller 210 may perform an initialization operation. After the initialization controller 210 performs the initialization operation, the debug controller 231 may be connected to the external device through the initialization controller 210 and the interfacing component 220.

Although an initialization operation of the code executor 233 is not performed, the debug controller 231 may be connected to the interfacing component 220. That is, since each of the debug controller 231 and the code executor 233 separately performs an initialization operation, only the debug controller 231 may perform the initialization operation, and the initialized debug controller 231 may be connected to the interfacing component 220 through the initialization controller 210. When the initialized debug controller 231 and the interfacing component 220 are connected to each other, the debug controller 231 may perform an operation.

In an embodiment, when the interfacing component 220, the initialization controller 210, and the debug controller 231 are connected to each other, the interfacing component 220 may receive a suspend code setting request BCSET_REQ from the debugger 400. The interfacing component 220 may receive the suspend code setting request BCSET_REQ from the debugger 400 and provide the received suspend code setting request BCSET_REQ to the initialization controller 210. The initialization controller 210 may provide the suspend code setting request BCSET_REQ to the debug controller 231 through the bus.

The suspend code setting request BCSET_REQ may be a request for setting a suspend code address for a suspend code. The suspend code may be any one of codes stored in the ROM 240. That is, a code corresponding to the suspend code address may be set as a suspend code. The suspend code may be stored at a position corresponding to the suspend code address. When a suspend code address, which the code executor 233 receives from the ROM 240, and the set suspend code address are the same, the code executor 233 may suspend the execution of a code.

Consequently, the interfacing component 220 may receive a suspend code setting request BCSET_REQ from the debugger 400, and output the received request to the debug controller 231 through the initialization controller 210. The debug controller 231 may set a suspend code address, based on the received request. That is, the suspend code address for allowing the execution of a code to be suspended may be stored in the debug controller 231. The debug controller 231 may provide the suspend code address to the code executor 233.

When the suspend code address is set by the debug controller 231, the initialization controller 210 may change initialization bits IBIT such that the code executor 233 starts an initialization operation.

In an embodiment, the operation mode of the controller 200 may be changed from a normal mode to the debug mode, based on a signal input to the external pin, and the external device may set the connection bit to "0" in a state in which the power of the memory controller 200 is on. When the external device sets the connection bit to "0," the interfacing component 220 may receive a new suspend code setting request from the external device.

After the interfacing component 220 receives the new suspend code setting request, the interfacing component 220 may provide the new suspend code setting request to the debug controller 231 through the initialization controller 210. The debug controller 231 may then set a new suspend code address based on the new suspend code setting request.

FIG. 6 is a diagram illustrating codes stored in the ROM shown in FIG. 2 and a code address of each of the codes.

Referring to FIGS. 2 and 6, a first column shown in FIG. 6 represents a code address CODE_ADDR of each of some codes stored in the ROM 240, and a second column shown in FIG. 6 represents the code corresponding to a corresponding code address CODE_ADDR, i.e., each line shows the code CODE stored in the corresponding code address CODE_ADDR. The codes shown in FIG. 6 may be stored in the ROM 240. These codes stored in the ROM 240 may be used for the memory device 100 to perform an operation.

In the present disclosure, codes used to perform an operation are stored in the ROM 240 is described. However, such codes may be stored in various other memories instead of or in addition to the ROM 240.

FIG. 6 illustrates six codes CODE1 to CODE6 that are some of the codes stored in the ROM 240. However, in another embodiment, the ROM 240 may include a larger number of codes.

In an embodiment, the first code CODE1 may correspond to code address CODE_ADDR "0x0." That is, CODE1 may be stored at CODE_ADDR "0x0." The second code CODE2 corresponds to code address CODE_ADDR "0x4," and may be stored at CODE_ADDR "0x4." The third code CODE3 corresponds to code address CODE_ADDR "0x8," and may be stored at CODE_ADDR "0x8." The fourth code CODE4 corresponds to code address CODE_ADDR "0x12," and may be stored at CODE_ADDR "0x12." The fifth code CODE5 corresponds to code address CODE_ADDR "0x16," and may be stored at CODE_ADDR "0x16." The sixth code CODE6 corresponds to code address CODE_ADDR "0x20," and may be stored at CODE_ADDR "0x20."

In an embodiment, the code executor 233 may sequentially receive and execute the codes from a code corresponding to a starting address. That is, in this example, since the address corresponding to the first code CODE1 is the starting address, the code executor 233 may sequentially receive and execute the codes from the first code CODE1 to the sixth code CODE6.

In an embodiment, when the debug controller 231 sets a suspend code address, the code executor 233 may suspend the execution of a code, based on the codes received from the ROM 240 and the code address CODE_ADDR. The suspend code address may be set as an address of any one of the first to sixth codes CODE1 to CODE6.

Specifically, while the code executor 233 is sequentially receiving and executing the codes from a start code among the codes stored in the ROM 240, the code executor 233 may receive the same address as the suspend code address.

For example, when the suspend code is set as the fifth code CODE5, the code executor 233 may sequentially receive and execute the codes from the first code CODE1. Subsequently, when the code executor 233 receives the fifth code CODE5 and the address "0x16" of the fifth code CODE5, the code executor 233 may suspend code execution. After the operation of the code executor 233 is suspended, codes after the fifth code CODE5 may be executed one by one, operations of the codes may be monitored through the debugger, and an erroneous code may be detected based on the monitoring result. That is, the debugger may detect an operation error of the memory controller 200, which is caused by the codes executed after the suspend code.

In another embodiment, an operation of the memory controller 200 may be suspended before the code executor 233 receives the fifth code CODE5 and the address "0x16" of the fifth code CODE5. When the operation of the memory controller 200 is suspended, a suspend code address may be reset. That is, the address "0x8" of the third code CODE3 or the address "0x12" of the fourth code CODE4 prior to the address "0x16" of the fifth code CODE5 may be set as the suspend code address.

In an embodiment, when the debug controller 231 does not set the suspend code address, the code executor 233 may execute the codes without any suspension up to the last code.

Figure 7:
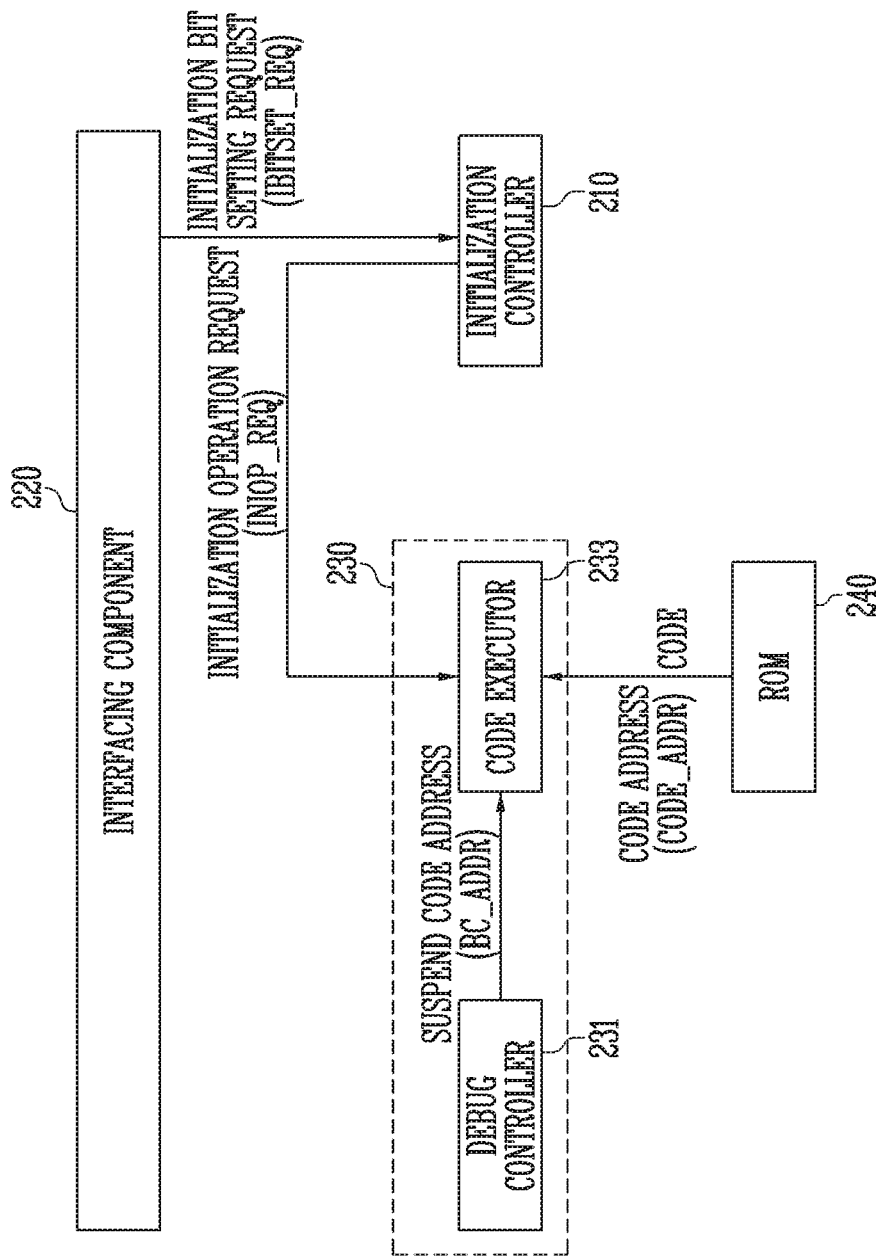
FIG. 7 is a diagram illustrating an initialization operation of a code executor, such as that shown in FIG. 3, and code execution of the code executor after a suspend code is set.

FIG. 7 is a diagram illustrating an initialization operation of the code executor shown in FIG. 3 and code execution of the code executor after a suspend code is set.

Referring to FIG. 7, the controller 200 shown in FIG. 7 may include the initialization controller 210, the interfacing component 220, the processor 230, and the ROM 240. In FIG. 7, a case where the RAM 250 among the components of the memory controller 200 shown in FIG. 2 is omitted is assumed. The processor 230 shown in FIG. 7 may include the debug controller 231 and the code executor 233.

FIG. 7 illustrates an operation after a suspend code address is set in the debug controller 231.

In an embodiment, after a suspend code address is set in the debug controller 231, the initialization controller 210 may control an initialization operation of the code executor 233.

When the interfacing component 220 and the initialization controller 210 are connected to each other, the interfacing component 220 may provide an initialization bit setting request IBITSET_REQ to the initialization controller 210. The initialization bit setting request IBITSET_REQ may be a request for the initialization operation of the code executor 233. That is, after an initialization operation of the debug controller 231, the code executor 233 may perform the initialization operation.

The initialization controller 210 may set bits of initialization bits IBIT, based on the initialization bit setting request IBITSET_REQ. Specifically, the initialization controller 210 may set a bit corresponding to the code executor 233 among the bits of the initialization bits IBIT. That is, the initialization controller 210 may set the initialization bits IBIT for starting the initialization operation of the code executor 233. The bit corresponding to the code executor 233 among the bits in the initialization bits IBIT may be changed from "0" as a default value to "1." The initialization controller 210 may control the code executor 233 to start the initialization operation, based on the changed initialization bits IBIT.

Specifically, the initialization controller 210 may provide an initialization operation request INIOP_REQ to the code executor 233. When the code executor 233 receives the initialization operation request INIOP_REQ, the state of the code executor 233 may be changed from a state in which the code executor 233 cannot perform any operation to a state in which the code executor 233 can perform an operation. That is, the state of the code executor 233 may be changed to a code-executable state, based on the initialization operation request INIOP_REQ.

After the code executor 233 performs the initialization operation, the code executor 233 may sequentially receive codes stored in the ROM 240 from a start code. That is, the ROM 240 may be in a state in which the ROM 240 can transmit codes to the code executor 233 starting from when the power of the memory controller 200 is on. When the code executor 233 performs the initialization operation, the codes stored in the ROM 240 may be transmitted to the code executor 233.

When the code executor 233 receives a code stored in the ROM 240, the code executor 233 may also receive a code address CODE_ADDR corresponding to the corresponding code.

In an embodiment, after the code executor 233 receives the code and the code address CODE_ADDR from the ROM 240, the code executor 233 may receive a suspend code address BC_ADDR from the debug controller 231. The suspend code address BC_ADDR may be set based on a suspend code setting request BCSET_REQ. Whenever the code executor 233 receives a code from the ROM 240, the code executor 233 may receive a suspend code address BC_ADDR from the debug controller 231.

The code executor 233 may determine whether an address of a code received after the start code and the suspend code address are the same. When the address of the code received after the start code and the suspend code address are the same, the code executor 233 may suspend an operation of executing the received code. When the address of the code received after the start code and the suspend code address are not the same, the code executor 233 may execute the received code.

When the execution of the received code is completed, the code executor 233 may receive a next code and an address of the next code from the ROM 240. After the code executor 233 receives the next code and the address of the next code, the code executor 233 may again receive a suspend code address from the debug controller 231. The code executor 233 may determine whether the received code is to be executed, based on whether the address of the next code and the suspend code address are the same.

When the code executor 233 suspends the operation of executing the received code since the address of the code received after the start code and the suspend code address are the same, the external device may set a connection bit to "1." When the external device set the connection bit to "1," the external device may be connected to the processor 230 through the interfacing component 220. When the interfacing component 220 and the processor 230 are connected to each other, the code executor 233 may sequentially execute the codes one by one from a suspend code corresponding to the suspend code address. The external device may detect an erroneous code by monitoring code execution of the code executor 233.

FIG. 8 is a diagram illustrating a method for setting initialization bits for controlling the initialization operation of the code executor shown in FIG. 3.

Referring to FIGS. 4 and 8, a first column shown in FIG. 8 represents components of the memory controller 200, and a second column shown in FIG. 8 represents initialization bits IBIT. The initialization bits IBIT shown in FIG. 8 may be stored in the initialization controller 210. The initialization bits IBIT shown in FIG. 8 may respectively correspond to the components of the memory controller 200. When a bit of the IBIT is changed, the initialization controller 210 may control an initialization operation of the component corresponding to the changed bit.

FIG. 8 illustrates initialization bits IBIT changed for the code executor 233 to perform an initialization operation, after the initialization operation of the debug controller 231. Before an initialization bit setting request IBITSET_REQ is received from the interfacing component 220 after the initialization operation of the debug controller 231, only a bit corresponding to the debug controller 231 may be "1." That is, the bit corresponding to the debug controller 231 may be "1" such that the debug controller 231 sets a suspend code address.

When the initialization controller 210 receives the initialization bit setting request IBITSET_REQ, a bit corresponding to the code executor may be changed from "0" as a default value to "1." More generally, a bit corresponding to a particular component may be changed to "1" such that the corresponding component performs the initialization operation. When the bit corresponding to the code executor 233 is changed to "1," the code executor 233 may perform the initialization operation.

Specifically, when the bit corresponding to the code executor 233 is changed, the initialization controller 210 may output an initialization operation request INIOP_REQ to the code executor 233. The code executor 233 may be in a state in which the code executor 233 can perform an operation, based on the initialization operation request INIOP_REQ.

While the code executor 233 is performing the initialization operation, other components may not perform any initialization operation. That is, since a bit corresponding to each of the UART and the TIMER is "0," the UART and the TIMER may not perform any initialization operation.

When a bit in the initialization bits IBIT is not changed, an initialization operation of the corresponding component may be postponed. Therefore, each of the components included in the memory controller 200 may be separately initialized. In particularly, each of the debug controller 231 and the code executor 233 included in the processor 230 may be separately initialized. Since each of the debug controller 231 and the code executor 233 can be separately initialized, the code executor 233 can perform an initialization operation after an initialization operation of the debug controller 231.

In an embodiment, in order to detect an erroneous code, initialization bits of some of other components in the memory controller in addition to the components shown in FIG. 4 may be changed to "1." That is, each of components for detecting an erroneous code may perform an initialization operation. Therefore, initialization bits of components, each of which an initialization operation is not required to detect an erroneous code, may not be changed to "1."

Figure 9:
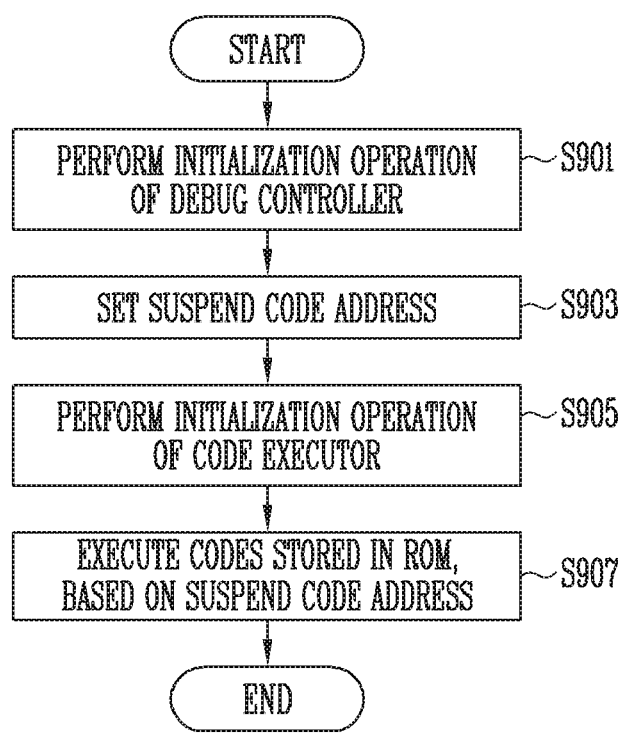
FIG. 9 is a diagram illustrating an operation of a memory controller in accordance with an embodiment of the present disclosure.

FIG. 9 is a diagram illustrating an operation of the memory controller in accordance with an embodiment of the present disclosure.

Referring to FIG. 9, in step S901, an initialization operation of the debug controller may be performed. The debug controller may set a suspend code address for a suspend code among codes stored in the ROM, which are used for the memory device to perform an operation.

Specifically, the debug controller may be included in the processor among the components of the memory controller. The initialization operation of the debug controller may include changing the state of the debug controller from a state in which the debug controller cannot perform any operation (non-operational state) to a state in which the debug controller can perform an operation (operational state). While the debug controller is performing the initialization operation, other components in the memory controller cannot perform any initialization operation. Therefore, no other components except the debug controller can perform any operation.

In step S903, the debug controller may set a suspend code address. The suspend code address may be an address corresponding to a suspend code. The suspend code address may be an address for suspending an operation of the code executor. When the code executor receives a suspend code address, the code executor may suspend the execution of the received code.

In step S905, an initialization operation of the code executor. The initialization operation of the code executor may be performed after the suspend code address is set in the debug controller. That is, after the initialization operation of the debug controller is performed, the initialization operation of the code executor may be performed. When the initialization operation of the code executor is performed, the state of the code executor may be changed to the operational state. Each of some components for detecting an erroneous code among the components of the memory controller may also perform an initialization operation.

In step S907, the code executor may execute the codes stored in the ROM, based on the suspend code address. Specifically, when the code executor performs an initialization operation, a code stored in the ROM and a code address at which the code is stored may be provided to the code executor. The code executor may execute the code received from the ROM.

In an embodiment, the code executor may receive a suspend code address. When the code executor receives the suspend code address, the code executor may suspend the execution of a code. The code executor may sequentially execute the codes from a suspend code after the code executor suspends an operation, and the external device may detect an erroneous code through the codes executed by the code executor. When the external device detects the erroneous code, the erroneous code may be corrected, and the corrected code may be stored in a ROM of a storage device.

Figure 10:
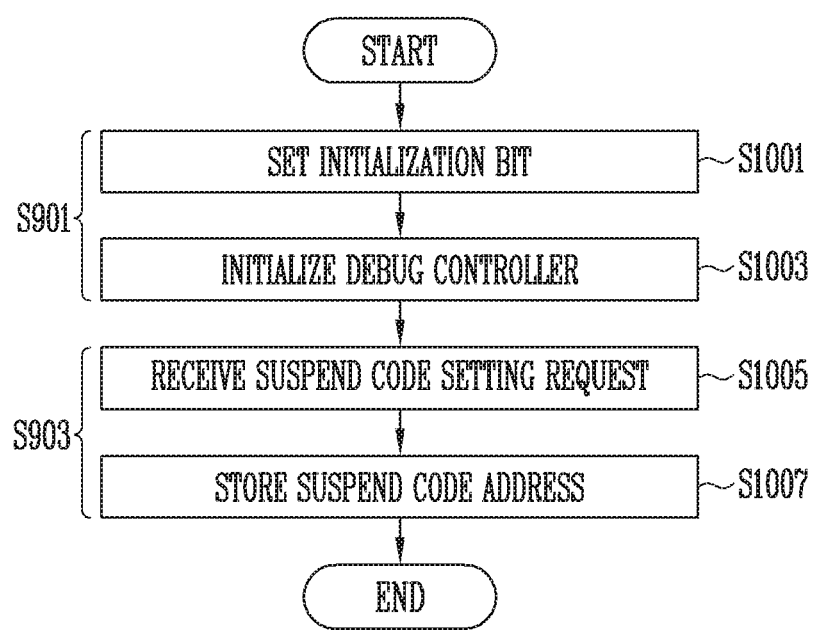
FIG. 10 is a diagram illustrating an operation of a memory controller in accordance with an embodiment of the present disclosure.

FIG. 10 is a diagram illustrating an operation of the memory controller in accordance with an embodiment of the present disclosure.

Referring to FIGS. 9 and 10, steps S1001 and S1003 depict step S901 in more detail. Steps S1005 and S1007 depict step S903 in more detail. That is, steps S1001 and S1003 illustrate in detail the initialization operation of the debug controller, and steps S1005 and S1007 illustrate in detail the step of setting the suspend code address.

In the step S1001, the initialization controller may set initialization bits. The initialization bits may control each of components of the memory controller to perform an initialization operation. The initialization controller may set initialization bits, based on an initialization bit setting request received from the interfacing component.

In an embodiment, power applied to the memory controller may be off and then be on. Before the power of the memory controller is on, the memory controller may be set to a debug mode. Subsequently, when the power of the memory controller is on, each of the components of the memory controller may perform an initialization operation starting from the initialization controller. When the initialization controller is in a state in which the initialization controller can perform an operation since the initialization controller performs the initialization operation, initialization bits for controlling the initialization operation of the debug controller to be performed may be set. That is, the initialization bits may be set so as to control the initialization operation of the debug controller. Specifically, a bit corresponding to the debug controller among bits in the initialization bits may be changed from "0" as a default value to "1."

In the step S1003, the debug controller may be initialized. In an embodiment, when the bit corresponding to the debug controller is changed to "1," the initialization controller may provide an initialization setting request to the debug controller. The debug controller may perform the initialization operation, based on the initialization setting request. When the debug controller is initialized, the state of the debug controller may be changed from the non-operational state to the operational state. Therefore, after the debug controller performs the initialization operation, the debug controller may be in a state in which the debug controller can set a suspend code address.

In the step S1005, the debug controller may receive a suspend code setting request through the interfacing component and the initialization controller. The suspend code setting request may be for setting a suspend code address.

When the power of the memory controller is on after the memory controller is set to the debug mode, the interfacing component may be connected to the debug controller through the initialization controller according to a connection bit set by the external device. When the interfacing component and the debug controller are connected to each other, the interfacing component may receive a suspend code setting request from the external device, and provide the received suspend code setting request to the debug controller.

In the step S1007, the debug controller may store a suspend code address. In an embodiment, the debug controller may set a suspend code address. The suspend code address may be an address at which a suspend code is stored. The suspend code may be code for allowing an operation of the code executor to be suspended.

In an embodiment, when the suspend code address is stored in the debug controller, the debug controller may provide the suspend code address to the code executor, whenever the code executor receives a code and an address of the code from the ROM. The code executor may execute the code, based on the suspend code address.

Figure 11:
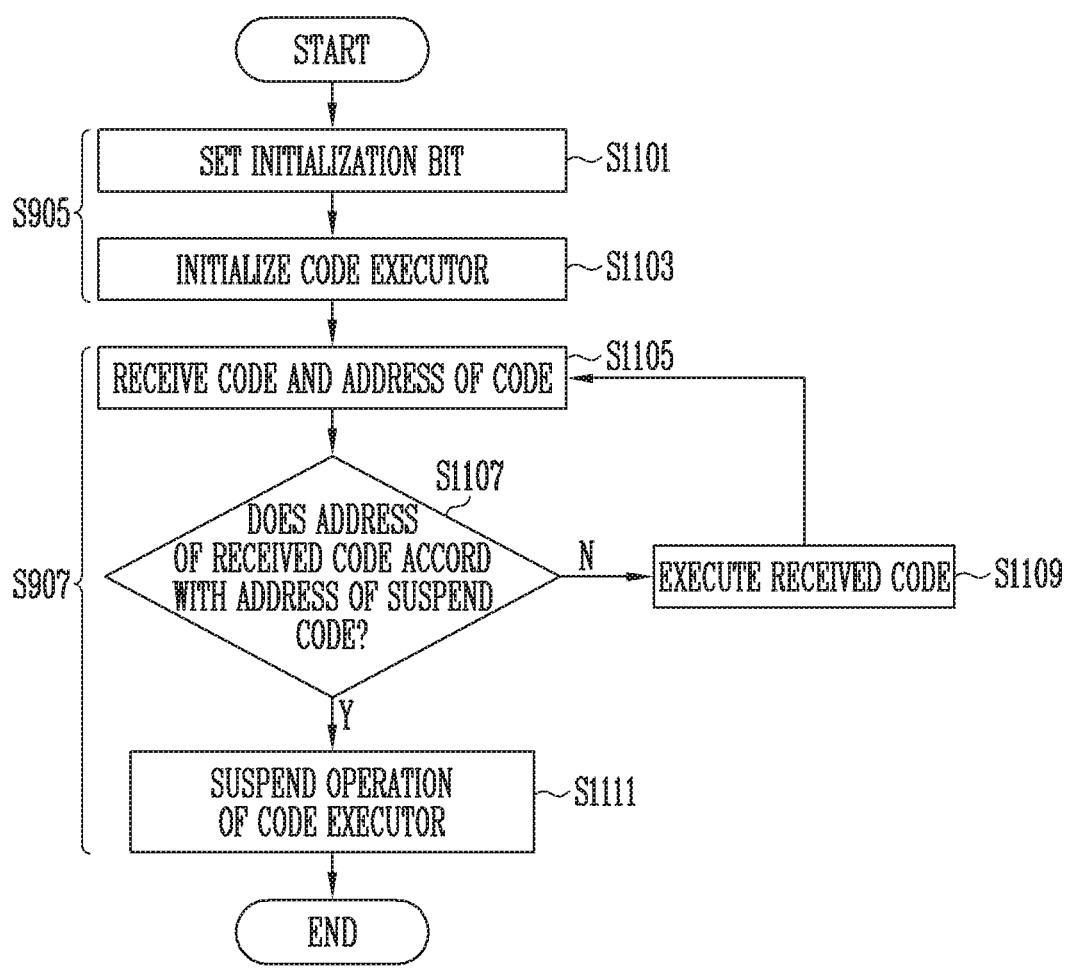
FIG. 11 is a diagram illustrating an operation of a memory controller in accordance with an embodiment of the present disclosure.

FIG. 11 is a diagram illustrating an operation of the memory controller in accordance with an embodiment of the present disclosure.

Referring to FIGS. 9 and 11, steps S1101 and S1103 are sub-steps of step S905. Steps S1105 to S1111 are sub-steps of step S907. That is, steps S1101 and S1103 illustrate in detail the initialization operation of the code executor, and steps S1105 to S1111 illustrate in detail the step in which the code executor executes the code.

In the step S1101, the initialization controller may set initialization bits. The initialization controller may set initialization bits, based on an initialization bit setting request received from the interfacing component. Before the initialization bit setting request is received, a bit corresponding to the debug controller among bits in the initialization bits may be "1," and a bit corresponding to each of the other components may be "0" as a default value. That is, when a suspend code address is set, the initialization bits may be set such that an initialization operation of the code executor is performed.

In the step S1103, the code executor may be initialized. Specifically, when a bit corresponding to the code executor is set to "1," the initialization controller may provide an initialization operation request to the code executor. The code executor may perform the initialization operation, based on the initialization operation request. When the code executor preforms the initialization operation, the code executor may be in a state in which the code executor can perform an operation.

That is, the ROM may be in a state in which the ROM can provide a code stored therein to the code executor. The code executor may be in a state in which the code executor can receive and execute codes from the ROM.

In the step S1105, the code executor may receive a code and a code address. The code received by the code executor may be any one of the codes stored in the ROM. The code address received by the code executor may be an address corresponding to the received code. That is, while the code executor is receiving a code stored in the ROM, the code executor may also receive a code address at which the corresponding code is stored.

In an embodiment, after the code executor receives a code stored in the ROM and a code address corresponding to the corresponding code, the code executor may receive a suspend code address stored in the debug controller. The code executor may execute codes stored in the ROM, based on the suspend code address.

In the step S1107, the code executor may determine whether the address of the code received from the ROM is the same as a suspend code address. When the address of the code received from the ROM is the same as the suspend code address, the operation proceeds to the step S1111. When the address of the code received from the ROM is not the same as the suspend code address, the operation proceeds to the step S1109.

In the step S1109, the code executor may execute the received code. That is, since a code for suspending an operation of the code executor is not received, the code executor may execute the received code. When the code executor completely executes the received code, the code executor may receive a next code and an address of the next code from the ROM.

In the step S1111, the operation of the code executor may be suspended. That is, since the suspend code address for suspending the operation of the code executor and the address of the received code are the same, the code executor may suspend the execution of a code. After the code executor suspends the execution of the code, the code executor may execute the codes one by one from the suspend code, and a result obtained by executing the codes may be monitored by the external device. Therefore, the codes are executed from the suspend code, and an erroneous code may be detected based on the result by executing the codes. When the external device detects an erroneous code, the erroneous code may be corrected, and the corrected code may be stored in a ROM of a storage device which will be produced later.

Figure 12:
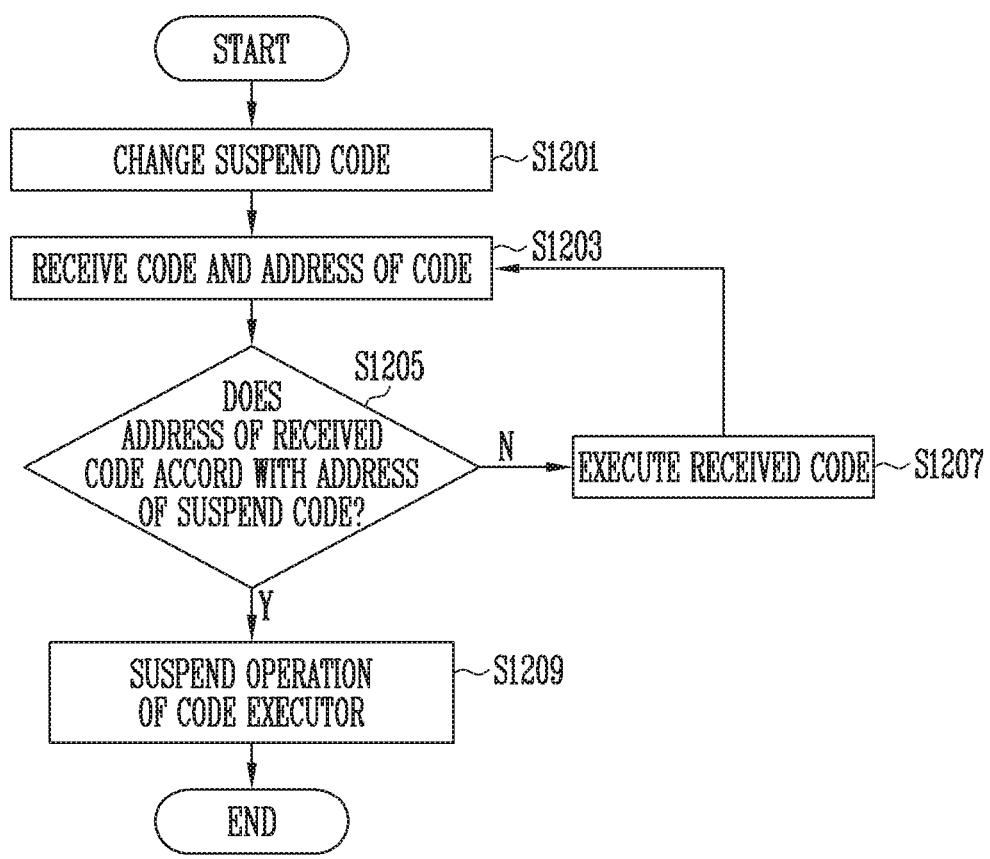
FIG. 12 is a diagram illustrating an operation of a memory controller in accordance with an embodiment of the present disclosure.

FIG. 12 is a diagram illustrating an operation of the memory controller in accordance with an embodiment of the present disclosure.

Referring to FIGS. 11 and 12, the steps shown in FIG. 12 may be additionally performed after step S1111. That is, FIG. 12 illustrates steps that may be additionally performed after the operation of the code executor is suspended.

In step S1201, a suspend code may be changed. Such change may mean a change of a suspend code address stored in the debug controller. After the step S1111, the debug controller may change the suspend code address, when any erroneous code is not detected even though the code executor executes a code. The debug controller may change the suspend code address by receiving a suspend code setting request from the external device, or change the suspend code address after a certain time elapses.

In step S1203, the code executor may receive a code and an address of the code. The code received by the code executor may be any one of the codes stored in the ROM. The code address received by the code executor may be an address corresponding to the received code. That is, while the code executor is receiving a code stored in the ROM, the code executor may also receive a code address at which the corresponding code is stored.

In step S1205, the code executor may determine whether the address of the code received from the ROM is the same as the suspend code address. When the address of the code received from the ROM is the same as the suspend code address, the operation proceeds to step S1209. When the address of the code received from the ROM is not the same as the suspend code address, the operation proceeds to step S1207.

In the step S1207, the code executor may execute the received code. That is, since a code for suspending an operation of the code executor is not received, the code executor may execute the received code. When the code executor completely executes the received code, the code executor may receive a next code and an address of the next code from the ROM.

In the step S1209, the operation of the code executor may be suspended. That is, since the suspend code address for suspending the operation of the code executor and the address of the received code are the same, the code executor may suspend the execution of a code. After the code executor suspends the execution of the code, the code executor may execute the codes one by one from the suspend code, and a result obtained by executing the codes may be monitored by the external device. Therefore, the codes are executed from the suspend code, and an erroneous code may be detected based on the result by executing the codes. When the external device detects an erroneous code, the erroneous code may be corrected, and the corrected code may be stored in a ROM of a storage device which will be produced later.

Figure 13:
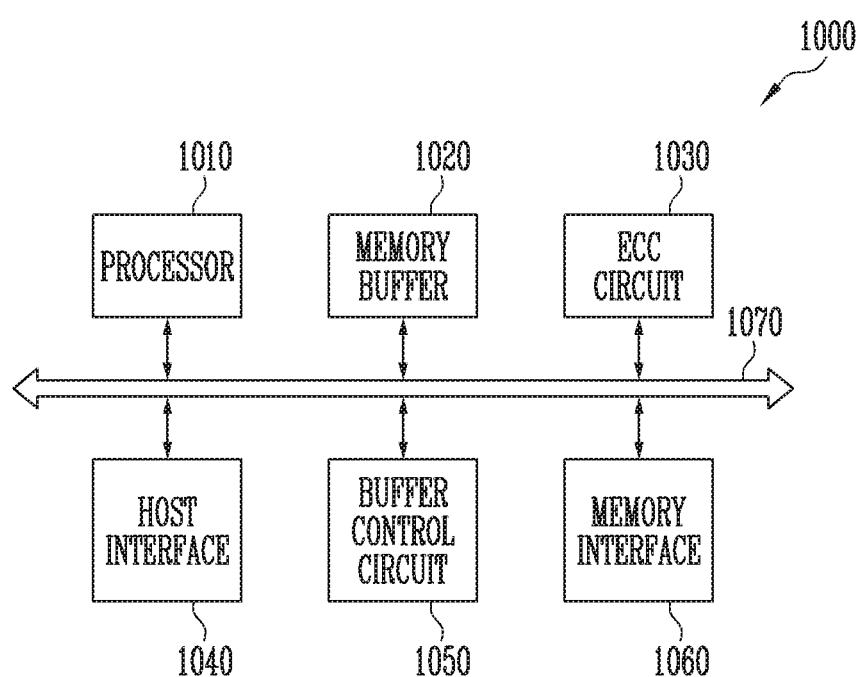
FIG. 13 is a diagram illustrating another embodiment of a memory controller.

FIG. 13 is a diagram illustrating another embodiment of the memory controller shown in FIG. 1.

Referring to FIG. 13, a memory controller 1000 is connected to a host and a memory device. The memory controller 1000 is configured to access the memory device in response to a request received from the host. For example, the memory controller 1000 is configured to control read, program, erase, and background operations of the memory device. The memory controller 1000 is configured to provide an interface between the memory device and the host. The memory controller 1000 is configured to drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to be translated into a PBA. Several address mapping methods of the FTL exist according to mapping units. A representative address mapping method includes a page mapping method, a block mapping method, and a hybrid mapping method.

The processor 1010 is configured to randomize data received from the host. For example, the processor 1010 may randomize data received from the host, using a randomizing seed. The randomized data is provided as data to be stored to the memory device to be programmed in the memory cell array.

In a read operation, the processor 1010 is configured to derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a nonvolatile memory express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and as a result may not interfere with, or influence, each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 14:
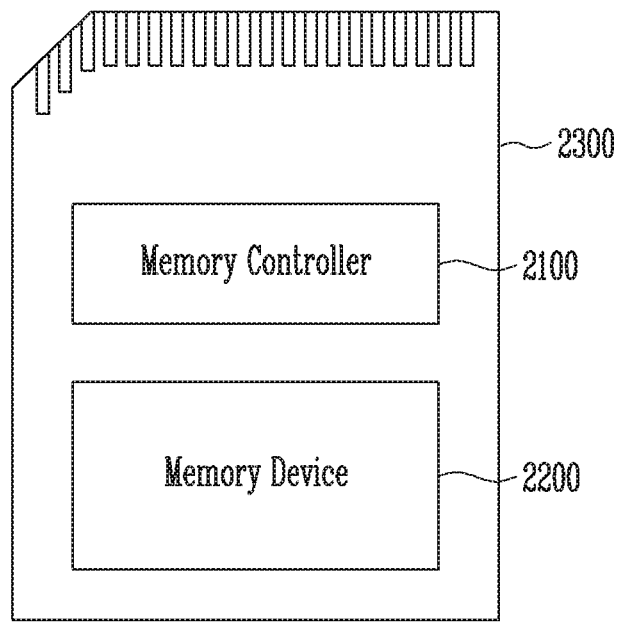
FIG. 14 is a block diagram illustrating a memory card system to which the storage device is applied in accordance with an embodiment of the present disclosure.

FIG. 14 is a block diagram illustrating a memory card system to which the storage device is applied in accordance with an embodiment of the present disclosure.

Referring to FIG. 14, the memory card system 2000 includes a memory controller 2100, a memory device, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to driver firmware for controlling the memory device 2200. The memory device 2200 may be implemented identically to the memory device 100 described with reference to FIG. 1.

In an example, the memory controller 2100 may include components such as a Random Access Memory (RAM), a processor, a host interface, a memory interface, and the error corrector 233.

The memory controller 2100 may communicate with an external device through the connector 2300. The memory controller 2100 may communicate with the external device (e.g., the host) according to a specific communication protocol. In an example, the memory controller 2100 may communicate with the external device through at least one of various communication protocols, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and/or NVMe.

In an example, the memory device 2200 may be implemented with any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), and/or a Spin Torque Transfer magnetic RAM (STT-MRAM).

The memory controller 2100 and the memory device 2200 may be integrated into a single semiconductor device to constitute a memory card, such as a PC card (Personal Computer Memory Card International Association (PCM-CIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and/or a Universal Flash Storage (UFS).

Figure 15:
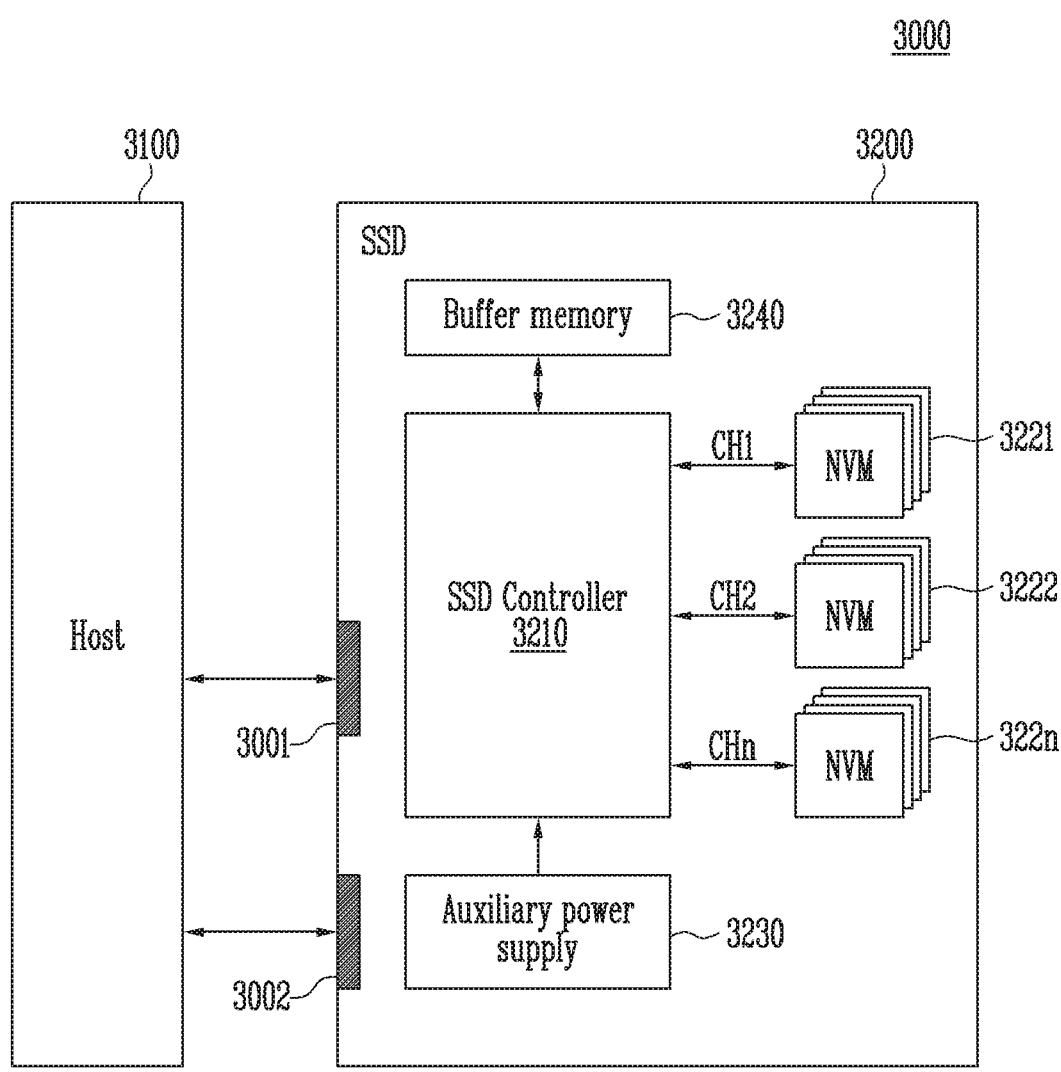
FIG. 15 is a block diagram illustrating a Solid State Drive (SSD) system to which the storage device is applied in accordance with an embodiment of the present disclosure.

FIG. 15 is a block diagram illustrating a Solid State Drive (SSD) system to which the storage device is applied in accordance with an embodiment of the present disclosure.

Referring to FIG. 15, the SSD system 3000 includes a host 3100 and an SSD 3200. The SSD 3200 exchanges a signal SIG with the host 3100 through a signal connector 3001, and receives power PWR through a power connector 3002. The SSD 3200 includes an SSD controller 3210, a plurality of flash memories 3221 to 322n, an auxiliary power supply 3230, and a buffer memory 3240.

In an embodiment, the SSD controller 3210 may serve as the memory controller 200 described with reference to FIG. 1.

The SSD controller 3210 may control the plurality of flash memories 3221 to 322n in response to a signal SIG received from the host 3100. In an example, the signal SIG may be a signal based on an interface between the host 3100 and the SSD 3200. For example, the signal SIG may be defined by at least one of various interfaces, such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and/or an NVMe.

The auxiliary power supply 3230 is connected to the host 3100 through the power connector 3002. When the supply of power from the host 3100 is not smooth, the auxiliary power supply 3230 may provide power of the SSD 3200. In an example, the auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 16:
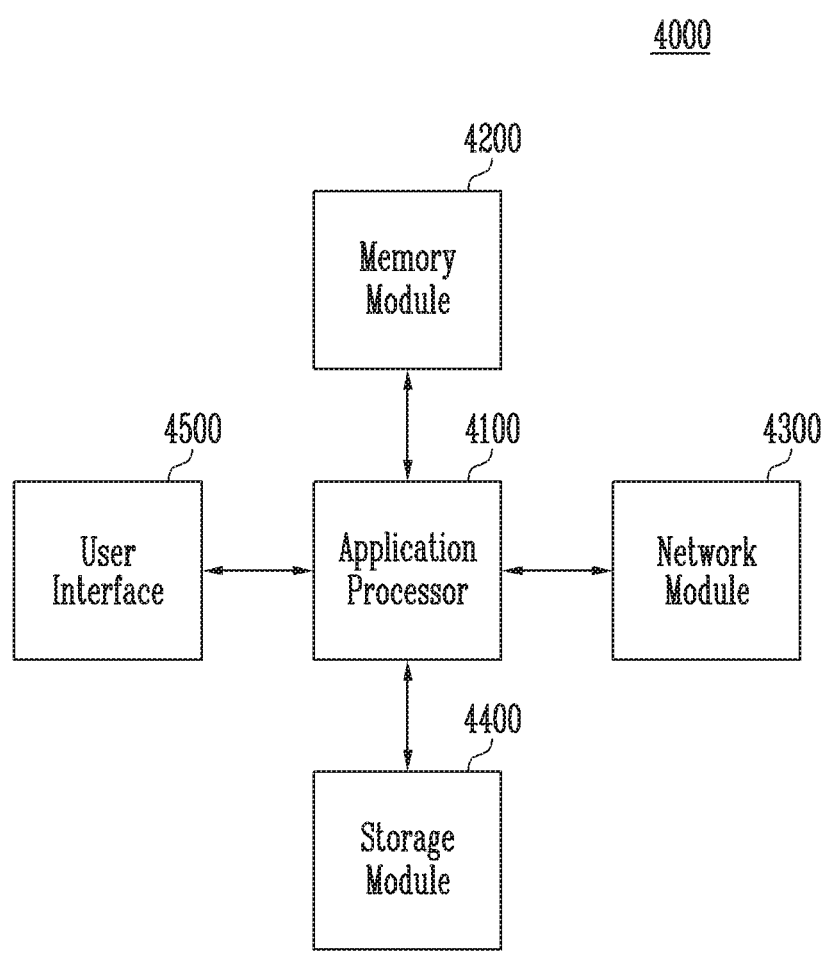
FIG. 16 is a block diagram illustrating a user system to which the storage device is applied in accordance with an embodiment of the present disclosure.

FIG. 16 is a block diagram illustrating a user system to which the storage device is applied in accordance with an embodiment of the present disclosure.

Referring to FIG. 16, the user system 4000 includes an application processor 4100, a memory module 4200, a network module 4300, a storage module 4400, and a user interface 4500.

The application processor 4100 may drive components included in the user system 4000, an operating system (OS), a user program, or the like. In an example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. In an example, the application processor 4100 and the memory module 4200 may be provided as one semiconductor package by being packaged based on a Package on Package (PoP).

The network module 4300 may communicate with external devices. In an example, the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), Wimax, WLAN, UWB, Bluetooth, and Wi-Fi. In an example, the network module 4300 may be included in the application processor 4100.

The storage module 4400 may store data. For example, the storage module 4400 may store data received from the application processor 4100. Alternatively, the storage module 4400 may transmit data stored therein to the application processor 4100. In an example, the storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. In an example, the storage module 4400 may be provided as a removable drive such as a memory card of the user system 4000 or an external drive.

In an example, the storage module 4400 may include a plurality of nonvolatile memory devices. The storage module 4400 may operate to the same or substantially the same as the storage device 50 described with reference to FIG. 1.

The user interface 4500 may include interfaces for inputting data or commands to the application processor 4100 or outputting data to an external device. In an example, the user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, an LED, a speaker, and a monitor.

In accordance with embodiments of the present disclosure, a memory controller capable of detecting a code having an error among codes stored in a ROM, and an operating method of the memory controller are provided.

While the present invention has been shown and described with reference to various embodiments thereof, it will be understood by those skilled in the art that various changes in form and details may be made therein without departing from the spirit and scope of the present invention as defined by the appended claims and their equivalents. Therefore, the scope of the present disclosure should not be limited to the above-described embodiments but should be determined by the scope of the appended claims including equivalents thereof.

In the above-described embodiments, all steps need not necessarily be performed. Steps may be combined. Also, the steps are not necessarily performed in accordance with the described order and may be rearranged. The embodiments disclosed in this specification and drawings are only examples to facilitate an understanding of the present invention, not to limit it. That is, it should be apparent to those skilled in the art that various modifications can be made on the basis of the technological scope of the present disclosure.

Although specific terminologies are used herein, they are only to explain the embodiments of the present invention, not to restrict it. As those skilled in the art will understand in light of the present disclosure, various modifications can be made, and all such modifications in addition to the disclosed embodiments are encompassed by the present invention to the extent they fall within the scope of the claims.

What is claimed is:

1. A memory controller comprising:
   a code memory configured to store codes;
   a code executor configured to execute the codes stored in the code memory;
   a debug controller; and
   an initialization controller configured to sequentially control an initialization operation of the debug controller and an initialization operation of the code executor for detecting an operation error in a debug mode,
   wherein the debug controller, after the initialization operation of the debug controller, sets a suspend code address for suspending the execution of the codes in response to a suspend code setting request received through an interfacing component and sends the suspend code address to the code executor, and
   wherein the code executor, after receiving the suspend code address from the debug controller, executes the initialization operation of the code executor and executes the codes until an address of a code among the codes and the suspend code address are the same.

2. The memory controller of claim 1, wherein a processor including the debug controller and the code executor and the initialization controller are selectively coupled to a debugger for detecting an operation error of the memory controller, which is caused by codes performed after a suspend code, through the interfacing component,
   wherein the processor or the initialization controller is coupled to the debugger through the interfacing component, based on whether the code executor has received the suspend code address.

3. The memory controller of claim 1, wherein the debug controller and the code executor are implemented as firmware driven by a processor.

4. The memory controller of claim 1, wherein the initialization controller sets an initialization bit of initialization bits, for controlling start of an initialization of at least one of the debug controller and the code executor.

5. The memory controller of claim 4, wherein the initialization bits are set in each of the debug controller and the code executor.

6. The memory controller of claim 5, wherein the initialization bits are set such that each of the debug controller and the code executor postpones an initialization operation, after the initialization controller starts an initialization operation.

7. The memory controller of claim 6, wherein the initialization controller changes an initialization bit for the debug controller such that the debug controller starts the initialization operation.

8. The memory controller of claim 7, wherein the initialization bits are set such that the code executor postpones the initialization operation until before the suspend code address is set after the debug controller starts the initialization operation.

9. The memory controller of claim 7, wherein, when the debug controller starts the initialization operation, the debug controller sets the suspend code address for suspending an operation of the code executor, based on the suspend code setting request.

10. The memory controller of claim 9, wherein, when the suspend code address is set by the debug controller, the initialization controller changes the initialization bits such that the code executor starts the initialization operation.

11. The memory controller of claim 10, wherein the code executor sequentially receives the codes stored in the code memory from a start code, and determines whether the address of the code received after the start code and the suspend code address are the same.

12. The memory controller of claim 11, wherein, when the address of the code received after the start code and the suspend code address are the same, the code executor suspends an operation of executing the received code.

13. The memory controller of claim 11, wherein, when the address of the code received after the start code and the suspend code address are not the same, the code executor executes the received code.

14. A method for operating a memory controller for controlling a memory device, the method comprising:
   performing an initialization operation of a debug controller for setting a suspend code address for suspending execution of codes in a debug mode for detecting an operation error;
   setting the suspend code address and sending the suspend code address to a code executor after the performing of the initialization operation of the debug controller;
   performing an initialization operation of the code executor for executing the codes after the sending of the suspend code address to the code executor;
   executing the codes after the initialization operation of the code executor; and
   suspending the execution of the codes when an address of a code among the codes and the suspend code address are the same.

15. The method of claim 14, wherein the performing of the initialization operation of the debug controller includes setting an initialization bit corresponding to the debug controller, of initialization bits, for controlling start of the initialization operation of the debug controller.

16. The method of claim 15, wherein the performing of the initialization operation of the code executor includes changing, when the suspend code address is set, an initialization bit corresponding to the code executor, of initialization bits such that the code executor starts the initialization operation.

17. The method of claim 14, wherein the executing of the codes includes:
- sequentially receiving the codes stored in a code memory from a start code, and
- determining whether the address of the code received after the start code and the suspend code address are the same.

18. The method of claim 17, wherein the executing of the codes further includes suspending executing the code received after the start code when the address of the code received after the start code and the suspend code address are the same.

19. The method of claim 17, wherein the executing of the codes further includes executing the code received after the start code when the address of the code received after the start code and the suspend code address are not the same.

* * * * *